United States Patent Office 3,039,086
Patented June 12, 1962

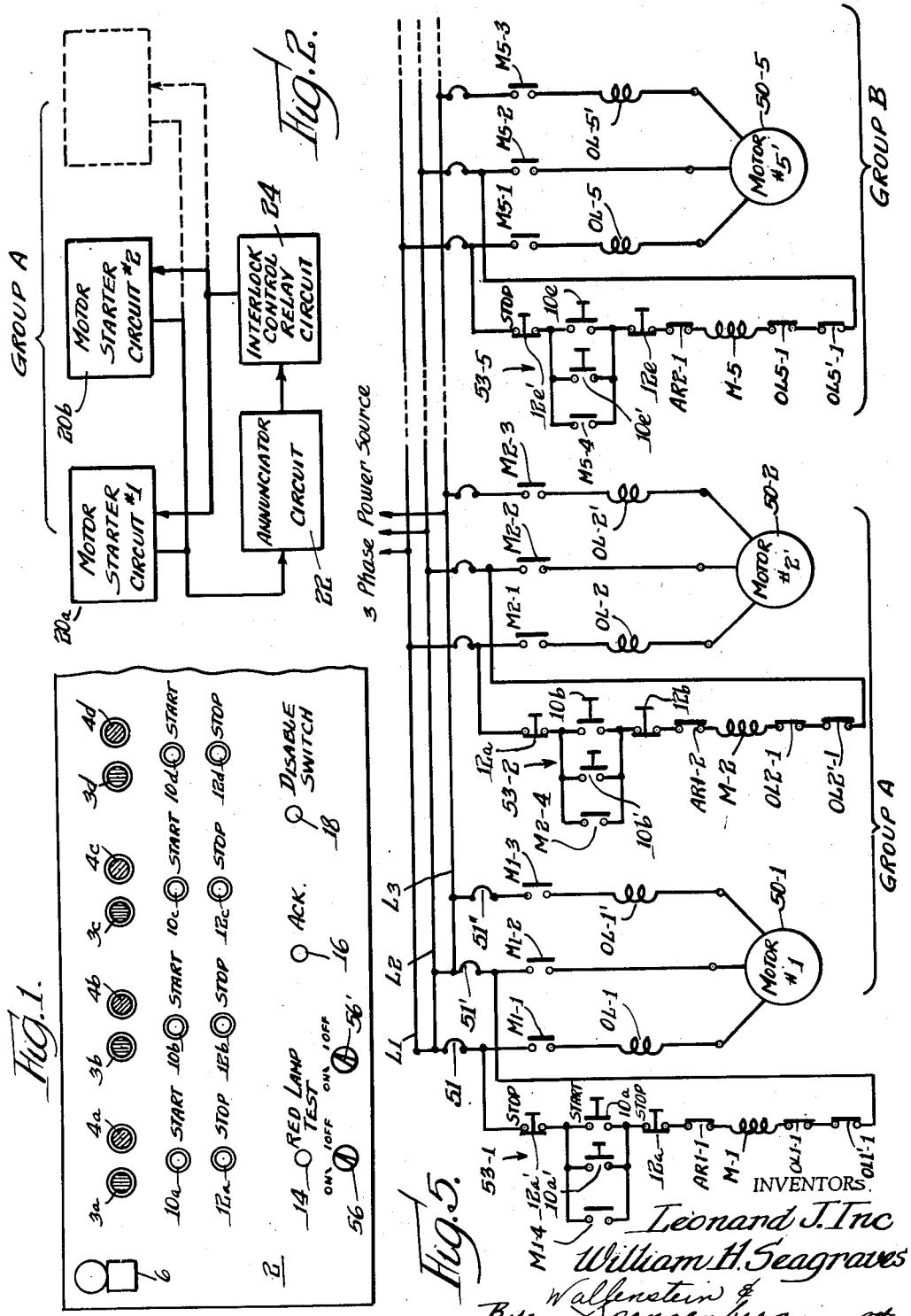

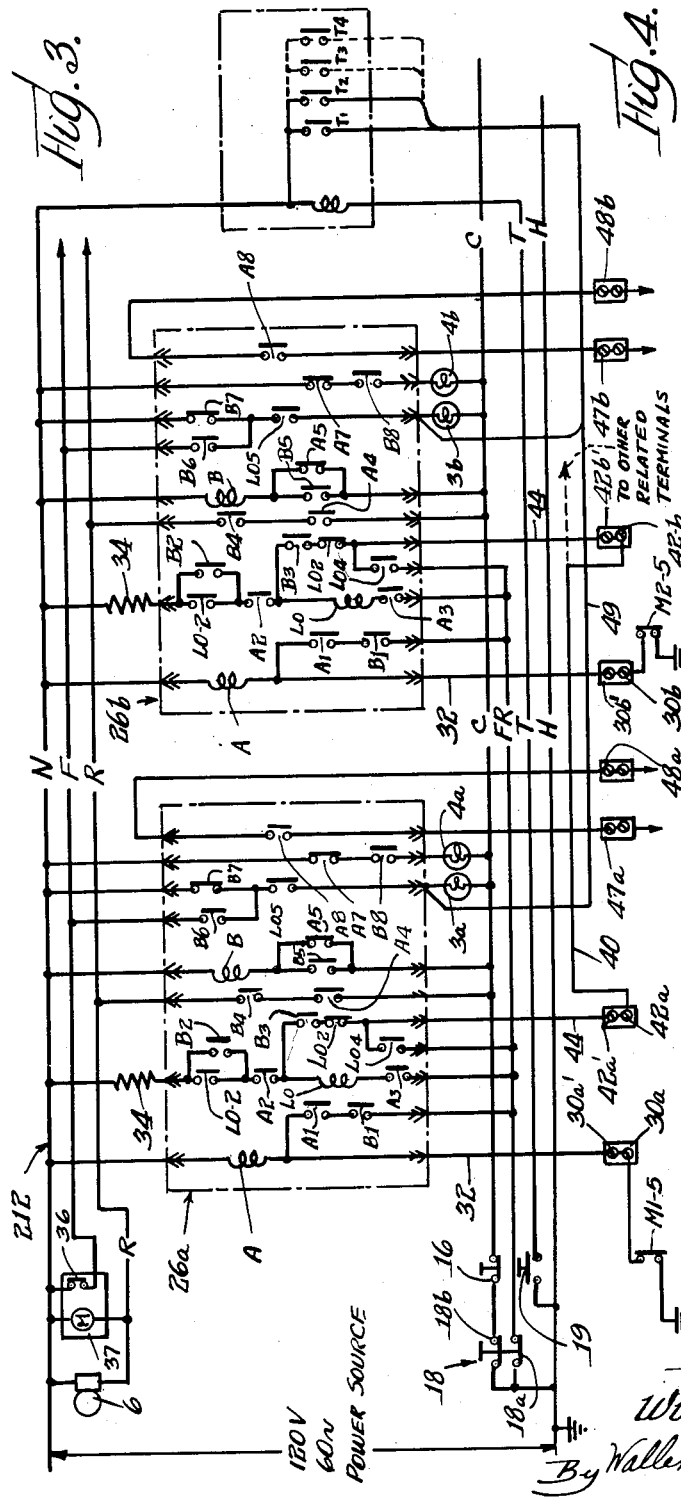

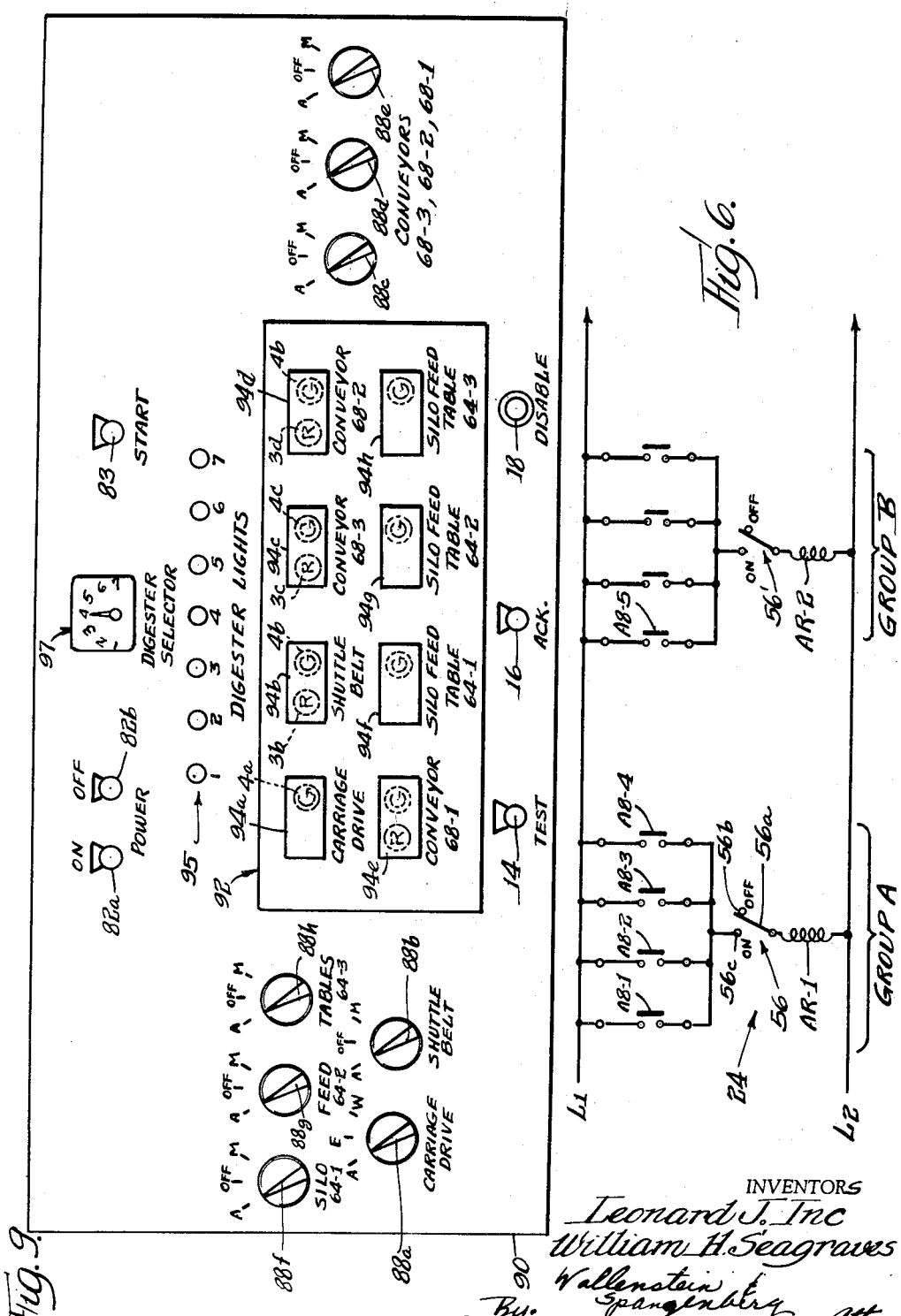

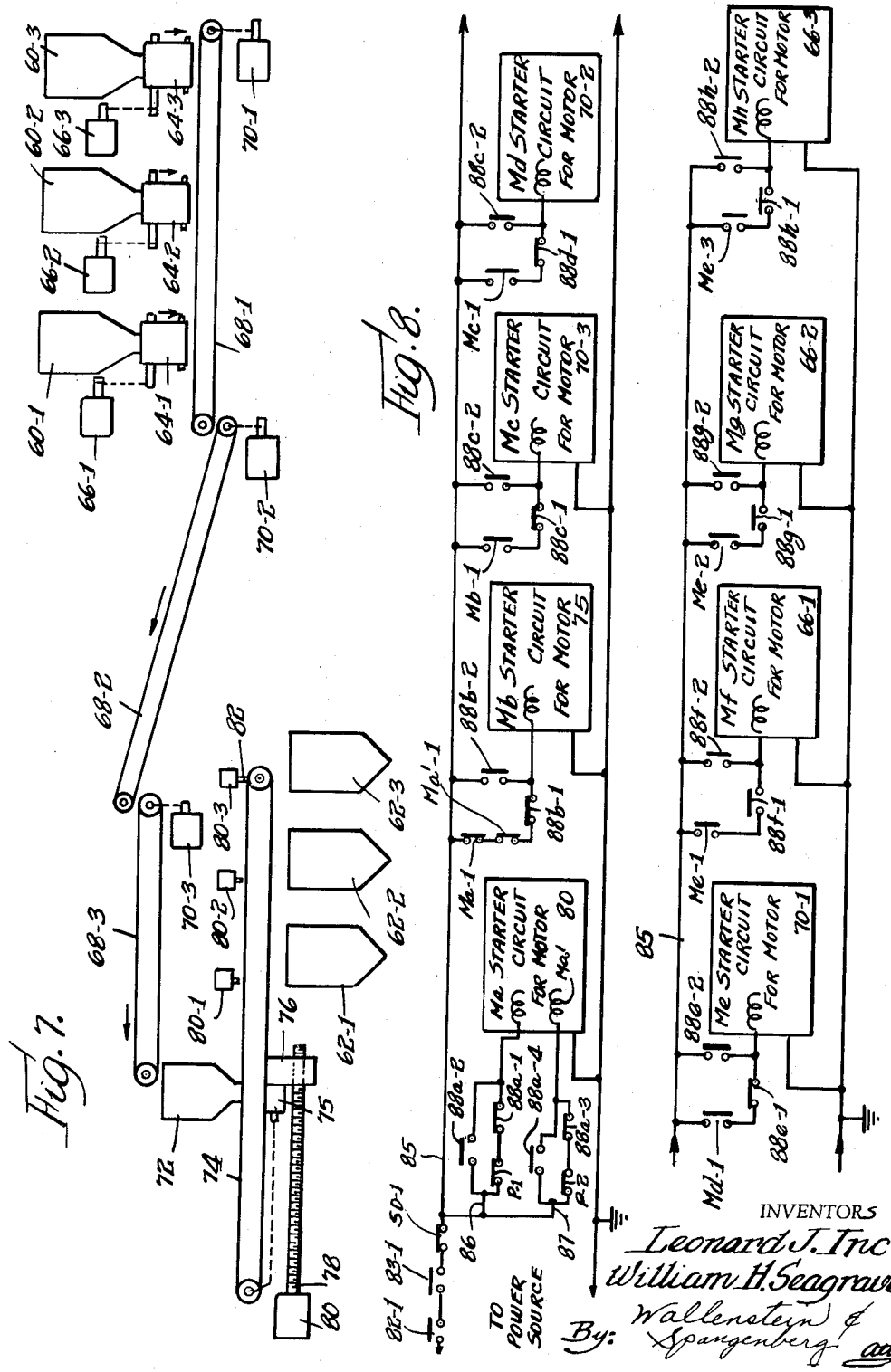

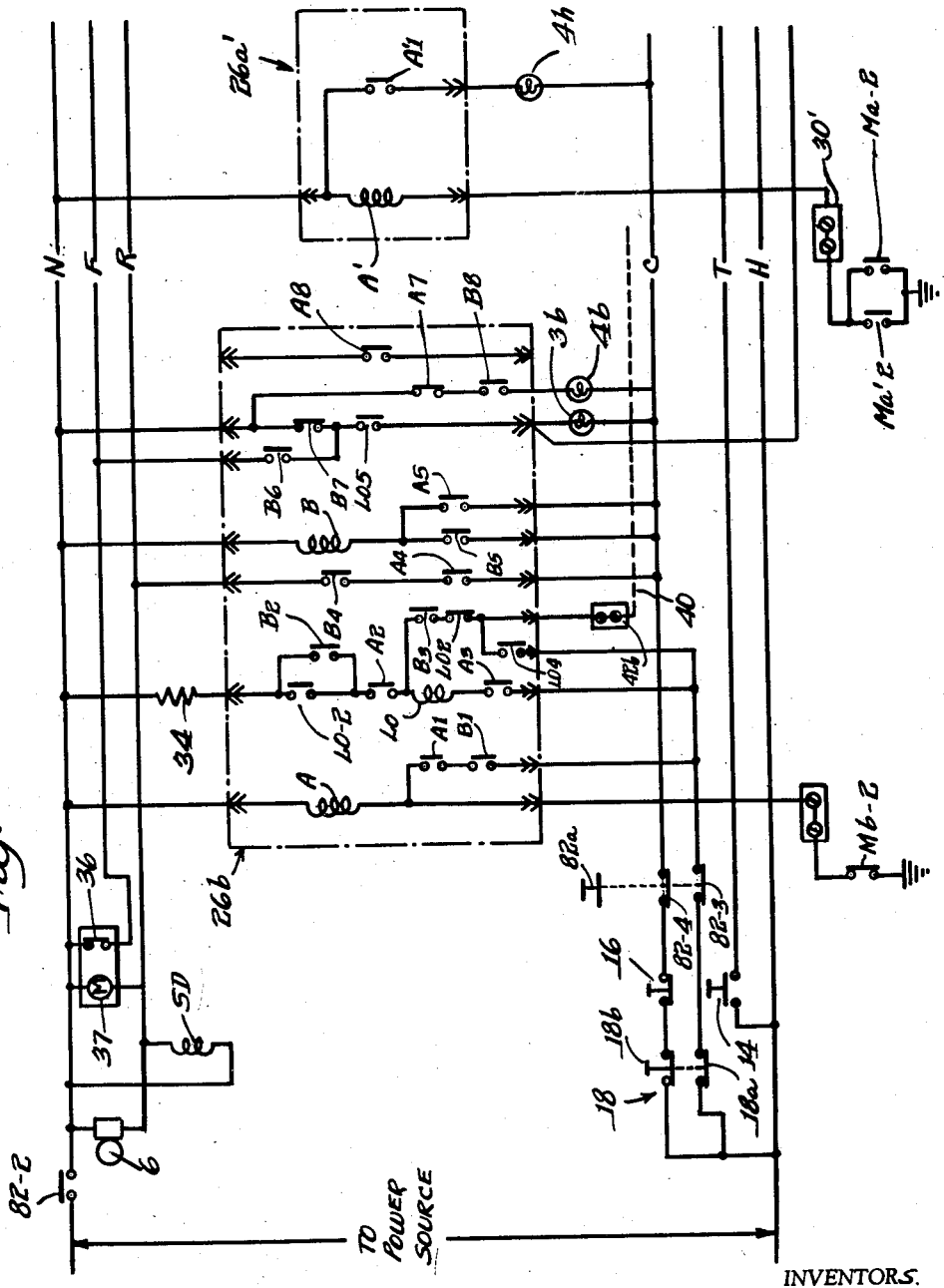

3,039,086
CONTROL AND ANNUNCIATOR SYSTEM
Leonard J. Inc, Chicago, and William H. Seagraves, Prospect Heights, Ill., assignors, by mesne assignments, to ISI, Incorporated, Skokie, Ill., a corporation of Illinois
Filed Jan. 7, 1959, Ser. No. 785,502
14 Claims. (Cl. 340—223)

The present invention relates to a control and annunciator system, particularly one for controlling and/or monitoring the running and shutdown conditions of a number of related apparatuses, and wherein abnormal shutdown of one of the apparatuses may be arranged to shut down some or all of the related apparatuses. In such case, it is desirable to determine which of the related shutdown apparatuses first shut down, so that the source of the trouble can be quickly pinpointed. To this end, the annunciator system may include an alarm light for each apparatus to be monitored and a control circuit which operates an audible alarm and the alarm light of the apparatus which is the first of the related apparatuses to become abnormally shut down to provide a first-to-become abnormal indication. In this way, the source of the trouble can be easily pinpointed. It is also desirable to change the initial indication to a different acknowledged indication which still indicates a first-to-become abnormal variable, such as a change from a flashing initial indication to a steady acknowledged indication by manual operation of an acknowledgement switch which also silences the audible alarm. An annunciator system which provides a first-to-become abnormal indication is disclosed in U.S. Patent Re. 24,031, granted June 28, 1955. In the annunciator circuit disclosed in this patent, provision is made for holding the acknowledged first-to-become abnormal indication even though the associated variable or apparatus returns to normal, until a manual reset switch is operated. This enables the operator to silence the horn without losing the record of the variable which first went abnormal when the latter variable returns to normal. Operation of the reset switch will, in any event, cancel the first-to-become abnormal indication even if the variable involved remains abnormal.

In the case where each monitored apparatus is provided with a running light which is controlled by the same annunciator circuit which controls the alarm light, certain difficulties arise which are overcome by the present invention. In such case, it is especially desirable for the operator to be able to see the running lights turn on as the apparatuses are initially manually or automatically set into operation. If the annunciator is operating when the apparatuses are shut down, the alarm light associated with the first apparatus to be shut down will be locked into a lighted condition which would prevent an associated running light controlled by the same circuit from turning on, even when the associated apparatus became operating again until the manual reset switch is operated. The requirement that the manual reset switch be operated before the running lights can go on is not desirable because then the system does not operate completely automatically to indicate the running conditions of the apparatuses being monitored, but is dependent on the much less dependable human element. Also, as above indicated, operation of the manual reset switch to render the running lights operable would cancel the indication of a first-to-become abnormal shutdown apparatus which would be undesirable in a case where the apparatus is shut down adnormally.

It is, accordingly, one of the objects of the present invention to provide an annunciator system for monitoring the running and shutdown conditions of a number of apparatuses, the system being automatically operable after acknowledgement to indicate both running as well as the shutdown conditions of the apparatuses. A related object of the invention is to provide an annunciator system as just described wherein, following any shutdown condition and acknowledgement thereof, the system is automatically operable to indicate the moment the apparatus involved starts running again without the need for operating any manual switches, or switches which would cancel a first-to-become shutdown indication where the shutdown apparatus abnormally remains in that condition.

Another one of the objects of the present invention is to provide an annunciator system as just described where acknoweldgement means are provided for changing the initial alarm indication on the alarm light associated with an apparatus which first shut down abnormally to another indication indicating an acknowledged condition of the annunciator. A related object of the present invention is to provide an annunciator and control system as just described wherein the annunciator includes means for automatically turning off all apparatuses in a related group of apparatuses if any one of the apparatuses in the group shuts down abnormally. A still further related object of the present invention is to provide an annunciator and control system for monitoring and controlling the running and shutdown conditions of related apparatuses, wherein the annunciator includes means for automatically disabling the shutdown functions of the system during the initial start up of the apparatuses involved.

In accordance with one aspect of the present invention, the annunciator system is provided with a pair of lights for each apparatus, which lights are controlled by the same circuit. One light is an alarm light which, when initially energized, provides a distinguishing indication representing an unacknowledged first-to-become shutdown condition of the associated apparatus, and the other light is a running light which provides a different indication representing the running condition of the associated apparatus.

Means including a manually operable acknowledgement switch are provided for causing an acknowledged first-to-become shutdown indication to appear on the alarm light of the apparatus which first shuts down. Lock-in of the acknowledged indication is eliminated to provide an automatic reset circuit. A light disable switch is provided to cancel an alarm light indication even when the associated apparatus is shut down, so that the display board containing the alarm lights can be clear where, for example, the shutdown conditions of the associated apparatus have been recorded and the apparatuses are to remain in this condition for an appreciable length of time.

In accordance with another aspect of the present invention, the annunciator performs a control function as well as an annunciator function and, to this end, includes a shutdown switch or the like which operates to shut down all related apparatuses when any apparatus of a given group is shut down. In order to enable the various apparatuses to be turned on during initial startup of the apparatuses involved, means are provided for disabling said shutdown switch upon operation of the acknowledgement switch or the disable switch of the annunciator circuit.

In accordance with a preferred form of the present invention, the annunciator circuit includes three control means associated with each apparatus, such as three control relays, one relay being referred to as alarm relay, the second relay being referred to as a lockout relay, and the third relay being referred to as an acknowledgment relay. The alarm relay is operated to its alarm condition by a set of signal contacts when the apparatus being monitored is shut down. The alarm relay has contacts which initially set the acknowledgment relay in a first condition of operation which is locked in by contacts of the acknowledgment relay until an acknowledgment switch is momentarily operated. The acknowledgment relay and the alarm relay have contacts in a circuit controlling the lockout relay which is operated to a first condition when the alarm relay is in its alarm condition and the acknowledgment relay is in its first condition of operation. One important distinguishing feature of this annunciator circuit from that described and disclosed in said Patent Re. 24,031 is that the lockout relay is automatically operated to its other condition after acknowledgment when the variable returns to normal. Contacts of the lockout relay control the alarm light so that the latter is initially turned on when the lockout relay is operated upon operation of the alarm relay but can be turned off by operating the disable switch even though the associated apparatus remains shut down. The running light, on the other hand, is operated independently of the lockout relay after acknowledgment and follows operation of the alarm relay so that it turns on whenever the apparatus involved is turned on.

The annunciator circuit, in addition to its control of the running and alarm lights, also effects control over the apparatuses to be monitored. That is, when any of the apparatuses in a related group of apparatuses stops operating, contacts of the annunciator circuit operate to shut down all related apparatuses. This is effected through auxiliary contacts controlled by the alarm relay of each annunciator unit. In the interest of flexibility, the terminals of all of these contacts are wired to separate terminals so that any one of a number of desirable shutdown or control schemes can be worked out using the annunicator of the present invention.

Other objects, features and advantages of the present invention will become apparent upon making reference to the specification to follow, the claims and the drawings, wherein:

FIG. 1 is an annunciator and control panel forming part of the annunciator and control system of the present invention;

FIG. 2 is a simplified box diagram of the arrangement of the components making up an embodiment of the present invention;

FIG. 3 is an annunciator and control circuit forming one of the major components of the present invention;

FIG. 4 is a table showing the sequence of operation of the alarm and running lights and the audible alarm for one of the variables monitored by the system under the various operating conditions thereof;

FIG. 5 is a start and stop control circuit for some of the apparatuses to be monitored, which, in the example being illustrated, are electric motors;

FIG. 6 is a schematic diagram of the interlock relay circuit which controls the automatic shutdown of the motors in two different groups of motors;

FIG. 7 is a diagrammatic view of a paper pulp conveying system to which the present invention is applicable;

FIG. 8 is a box diagram illustrating the interlocking relationship between the starter circuits of the motors which control the various parts of the conveyor system of FIG. 7;

FIG. 9 is the annunciator and control panel used with the conveyor system of FIG. 7; and FIG. 10 is an annunciator circuit for controlling some of the lights on the panel of FIG. 9 and the automatic shutdown of the conveyor motors.

Referring now to FIG. 1, in order to illustrate the utility of the present invention there is shown panel 2 which contains a plurality of pairs of lights 3a—4a, 3b—4b, 3c—4c, etc., which respectively indicate the shutdown and running conditions of electric motors controlling various apparatuses or variables found in industrial or public utility plants and the like. One of the lights 3a, 3b, or 3c, etc., of each pair of lights is adapted to provide a distinguishing indication, such as a red light, indicating an abnormal shutdown of the motor involved. The other light of each pair, namely, lights 4a, 4b, or 4c, etc., is adapted to provide a different light indication, such as a green (or other color) light, indicating the running condition of the associated motor. An audible alarm unit 6 is shown mounted on the panel 2, although the audible alarm means may be mounted externally of the panel. When one of the motors in a particular group of motors shuts down abnormally, audible alarm unit 6 will sound and the associated red light will flash red. Means are also provided for automatically shutting down the motors of all motors in the group involved when any one motor in the group shuts down, and means are provided for preventing the lighting of the red lights associated with the motors which shutdown following said one motor, so that the panel 2 displays a red light for only the motor which first shutdown, whereby the source of the trouble will be automatically pinpointed. When the motors are running, their associated green lights 4a, 4b, 4c, etc., will be energized to indicate the running condition of the motors.

Various control means are provided for manually starting and stopping the motors involved. These are also mounted on the panel 2 and, as illustrated take the form of pairs of push-button switches 10a—12a, 10b—12b, 10c—12c, etc., for each motor involved, momentary depression of the push-button switches 10a, 10b, etc., starting the motors involved and momentary depression of push-button switches 12a, 12b, etc., stopping the various motors involved. The panel 2 also has various other push-button controls, such as a red lamp test push-button switch 14 which, when momentarily depressed, turns on all the red lights 3a, 3b, 3c, etc. to test their operation, acknowledgment push-button switch 16 which, when momentarily depressed, silences the audible alarm unit 6 and changes a flashing red indication of the red lights to a steady red indication, and a disable switch 18 which, in accordance with the present invention, de-energizes all the red lights before the motors are initially turned on and enables the running lights 4a, 4b, 4c, etc. to be operated when the motors are initially turned on. Before start up of the motors involved, as soon as power is applied to the annunciator circuit, with the motors in their shutdown state, the annunciator circuit will operate to turn on one or more red lights to indicate falsely the abnormal shutdwon of the motors. In such case, the disable switch 18 will cancel all false red light indications. Then, as each start push-button switch 10a, 10b, 10c, etc., is depressed, in sequence, the green running lights 4a, 4b, 4c, etc., associated with various motors will be turned on at the time the associated motors are turned on. The operator is thus appraised of the initial running conditions of the motor, and if any green light fails to go on, the operator is immediately appraised of the fact that the motor is not operating properly.

Reference should now be made to FIG. 2 which illustrates in box form the various components forming the annunciator and shutdown system of the present invention applied to one related group of motors. The boxes 20a, 20b, etc. represent the motor control circuits of the individual motors to be monitored and which will be described in more detail hereinafter. The motor control circuits each include a relay (not shown in FIG. 2) which indicates the energized or de-energized condition of the motor starter circuit involved. The contacts of these relays are located in an annunciator circuit 22, the contacts controlling different respective alarm relays in this circuit, the details of which will be described hereinafter. As will appear, each of the alarm relays is physically and electrically associated with other relays to form an annunciator circuit unit, and contacts of the relays control the corresponding red and green alarm lights 3a—4a, 3b—4b, etc. on the panel 2 as well as relays in an interlock control relay circuit 24. The annunciator units associated with the related group of motors are arranged to control the same relay in the interlock control relay circuit 24, and contacts of the latter relay are located in the motor control circuits of all of the motors which are related. Consequently, when any one of the annunciator units is operated by the abnormal shut down of the associated motor, the interlock control relay circuit 24 will operate to stop all of the related motors.

Reference should now be made to FIG. 3 which illustrates the annunciator circuit 22. Each of the various aforementioned annunciator units are shown enclosed by dotted lines, such as 26a and 26b, and the various relays and relay contacts so enclosed may be mounted on a common plug-in unit, insertable into a socket in a chassis supported in a cabinet located behind the panel 2 (FIG. 1). The contacts controlled by said relays in the motor starter circuits 20a and 20b are shown, respectively, as normally-closed signal contacts M1–5, M2–5, etc., each of which are open when the associated motor is energized and are closed when the associated motor is de-energized. One of the terminals of each of these signal contacts is grounded and the other terminals are respectively connected to connecting terminals, such as 30a, 30b, etc.

Each plug-in or annunciator unit has three relays associated therewith, namely, an alarm relay A, which is initially energized on the closing of the associated signal contacts M1–5, M2–5, etc., occurring when the associated motor is de-energized, a lock out relay LO which is energized only if the relay A is the first relay of the associated group of annunciator units to become energized, and an acknowledgement relay B which is a normally energized relay which controls the flashing and steady on conditions of the associated red light 3a, 3b or 3c, etc.

Reference to the contacts of the various relays will be made by identifying each set of contacts by the letter identifying the corresponding relay coil followed by a number identifying the contacts of the relay involved. Also, the contacts are shown in their positions when the associated relay coils are de-energized, such positions being referred to as the normal position of the relays involved.

The circuit associated with the energization of each relay A, hereinafter sometimes referred to as the alarm relay circuit, is coupled across buses H and N, respectively, which buses are connected to the terminals of a suitable source of energizing potential, such as a source of a direct current potential, or the terminals of a common 60 cycle, 120 volt power system. The alarm relay circuit includes the signal contacts M1–5 or M2–5, etc., connected therein by means of a conductor 32 extending from a screw terminal 30a' or 30b', etc., connected with the aforementioned screw terminals 30a, 30b, etc. Each conductor 32 extends to the bottom terminal of the associated relay coil A and the upper terminal of the latter coil extends to the N bus. The H bus is a grounded bus so that closure of any one of the signal contacts M1–5 or M2–5, etc. will result in the energization of the associated alarm relay A. A holding circuit is provided for each alarm relay A through sets of normally-open contacts A1 and B1 connected in series between the bottom terminal of coil A and a normally grounded bus FR.

The B relay is normally energized so that the B1 contacts are closed when relay A is initially energized. If relay A is the first to be energized in the related group of annunciator units involved, the lock out relay LO becomes energized through a lock out relay circuit including a normally-closed set of contacts 18a of the aforementioned disable switch 18, the bus FR, normally-open contacts A3 which are closed since relay A is energized, lock out relay coil LO, normally-open contacts A2, normally-open contacts B2 (relay B is then energized) and current limiting resistor 34 connected to the bus N. Normally-open contacts LO2 are placed in parallel with normally-open contacts B2 to provide a means for holding the energization of lock out relay LO following depression of the acknowledgement switch 16, which de-energizes acknowledgement relay B and opens contacts B–2 in a manner to be explained.

Upon the initial energization of relays A and LO in the manner just described, the associated red light 3a, 3b, or 3c, etc., will be energized through a red light circuit including power bus H, the other normally-closed contacts 18b of the disable switch 18, the normally-closed contacts of acknowledgement switch 16, bus C, the associated red light 3a or 3b, etc., normally-open contacts LO5 which are now closed because relay LO is energized, normally-open contacts B6 which are closed because relay B is energized, flashing bus F, and flashing contacts 36 which are connected to the bus N. Flashing contacts 36 are oscillated at a visible rate between its open and closed conditions by a flasher motor 37 which is connected between the bus N and an audible alarm bus R. The audible alarm 6 previously mentioned is coupled in parallel with the flasher motor 37.

The circuit which controls the energization of the flasher motor 37 and the audible alarm 6 extends from the audible alarm bus R to the various annunciator units, 26a, 26b, etc. Each annunciator unit is connected to the audible alarm bus R through a branch including normally-open contacts B4 and normally-open contacts A4, the latter contacts being connected to the bus C which, as above explained, makes connection to the bus H through the acknowledgement switch contacts 16 and contacts 18b of the disable switch 18. Thus, upon the energization of alarm relay A, contacts A4 and B4 are closed to energize the audible alarm 6 and the flasher motor 37. As the flasher motor 37 opens and closes the contacts 36, the red light of the annunciator circuit which was just operated will flash on and off at a visible flashing rate.

If the relay A of the annunciator unit involved was not the first relay A of the grouped annunciator units to become energized, the lock out relay LO does not become energized, so that the normally-open contacts LO5 and the red light circuit are open and the associated red light remains unenergized. The lock out relay in the annunciator unit which was first energized renders the lock out relays of the other annunciator units of the group inoperative by shorting the terminals of the latter lock out relays in the manner now to be described. Therefore, only the red light of the first-to-become abnormal annunciator unit can be lighted.

Shorting out of the lock out relays is effected by coupling all lock out relay circuits together which are to be related in a particular group by a jumper or jumpers, such as jumper 40 connected between screw terminals, such as 42a and 42b, of the annunciator units involved. Each of the latter screw terminals are connected by conductor 44, extending from screw terminals 42a' and 42b' connected respectively to terminals 42a and 42b, through a set of normally-open contacts LO4 which, in turn, are connected to the bus FR. It is apparent that whenever one of the annunciator units becomes operative, that the resultant energization of the associated lock out relay LO will close the associated contacts LO4 to apply the ground potential of the bus H to the interconnected terminals 42a, 42b, etc. This ground potential is, in turn, connected to the normally ungrounded upper ends of the lock out relays LO associated with all the other annunciator units of the group involved, through the associated normally-closed contacts LO2 and normally-open contacts B3, then closed, extending to the upper or normally ungrounded ends of the lock out relays LO. This will short out the lock out relays involved except for the first lock out relay LO which became operative, since its normally closed contacts LO2 will then be open.

The annunciator units which are connected in parallel across the various buses illustrated in FIG. 3 can be associated in different groups and therefore operate independently insofar as their lock out relays are concerned. The circuit merely requires that the lock out connecting terminals 42a, 42b, etc., of the annunciator units of any one group be connected together in the manner illustrated. As previously indicated, the operation of the red light of any annunciator unit is dependent upon the energization of its lock out relay. Therefore, only the red light associated with the motor circuit which first became de-energized can light.

The energization circuit of each acknowledgement relay B extends from bus H and through normally-closed disable and acknowledgement contacts 18b and 16, respectively, bus C, normally-closed contacts A5 or alternately through holding contacts B5, and relay coil B leading to the bus N. Thus, the acknowledgement relay B is energized through the normally-closed contacts A5 or its own holding contacts B5 until either the normally-closed acknowledgement switch contacts 16 or the normally-closed disable switch 18b is opened. When the acknowledgement switch contacts 16 are momentarily open, relay B becomes de-energized since its holding contacts B5 open and normally-closed contacts A5 are then opened. The energization circuit for the red light involved is then transferred from the flashing bus F to the bus N through normally-closed transfer contacts B7 which close upon the de-energization of relay B. Contacts B7 are connected from the upper end of the associated lock out relay contacts LO5 and the bus N.

When the relay B has been de-energized by momentary depression of the acknowledgement switch contacts 16, the holding circuit for the associated alarm relay A is broken upon opening of the contacts B1, so that if the associated motor is turned on again resulting in the opening of the normally-open signal contacts M1-5, or M2-5, etc., the alarm relay A will become de-energized and the associated red light will be turned off because the associated lock out relay LO becomes de-energized upon the opening of contacts A3 and A2. After acknowledgement, the lock out relays of all annunciator units which are associated with motors which are still turned off, and which were turned off subsequent to the first motor which shut down, will remain de-energized because acknowledgement opened the contacts B2 which enables energization of the lock out relay LO on the energization of the associated alarm relay. A false first-to-become abnormal indication will not thereby result when said first motor is turned on.

In the annunciator circuit disclosed in said U.S. Patent Re. 24,031, a set of normally-open contacts of the lock out relay LO are connected across contacts A1 and B1 in the holding branch of the A relay to act as a holding circuit for the alarm relay after acknowledgement. This set of LO contacts prevents de-energization of the A or LO relays by depression of the acknowledgement switch 16 since these contacts keep the A relay energized. After acknowledgement therefore, the A and LO relays remain locked-in even when the variable returns to normal, which would prevent the operation of the running light if controlled by the A relay. Also, these LO contacts require a reset switch positioned as disable switch 18 to break the holding circuit of the A relay when the variable returns to normal, which switch would not be necessary where lock-in of the A relay after acknowledgement is not necessary. Moreover, operation of the reset switch to obtain automatic return to normal would cancel a first-to-become abnormal indication even though the variable was still abnormal.

In accordance with an aspect of the present invention, the disable switch 18 is provided despite the fact that lock-in of the A relay is not provided, to enable cancellation of the alarm lights when a normal or prolonged intended shutdown is involved.

Obviously, before the motor circuits are initially turned on, the signal contacts M1-5, M2-5, etc. of all of the annunciator units will be closed and the associated alarm A relays and the audible alarm will be energized, at least one and perhaps all of the lockout relays LO will be initially energized and their red lights will flash to give false alarm indications. Operation of the acknowledgement switch will silence the audible alarm and will change the flashing red lights to steady-on conditions which remain until the associated motors start operating whereupon their green lights will automatically turn on. If a subsquent shutdown of a motor occurs, the associated alarm light will flash on. Even when the motor was intentionally shut down, the red light can be turned off by operating the disable switch 18. This de-energizes the lockout relay LO and the acknowledgement relay. The lockout relay LO and hence the associated red light remain de-energized until the motor again starts and then shuts down again.

A test circuit for testing the operation of the various red lights is provided. (The operation of the green lights can be determined without a test circuit since they are normally on.) This test circuit includes normally-open push button switch 19 connected between the bus H and a test bus T. The test bus T is connected to the bottom terminal of a relay T. The upper terminal of this relay is connected to the N bus. The test circuit also includes a number of conductors gathered together in a cable 49, each of said conductors extending from the ungrounded terminals of the red lights of the various annunciator units to different normally-open contacts T1, T2, T3, etc. of the relay T. There must be one set of relay contacts for each annunciator unit, so it may be necessary to add additional test relays in parallel with relay T to provide the required number of contacts. It can be seen that when the test push button switch 19 is closed, relay T will energize which, upon closing of the contacts T1, T2, T3, etc., energize the properly operating red lights.

The running light 4a or 4b etc. of each annunciator unit has an energization circuit extending from power bus N and through normally-closed contacts A7, normally-open contacts B8 and light 4b connected to bus C. Thus, running light is energized wherever the associated alarm relay A is de-energized by start-up of the motor and acknowledgement relay B is energized (which condition is insured by de-energization of relay A). The de-energization of the A relay is permitted at starting by the previous operation of acknowledgement switch 16, which broke the holding circuit of the A relay even while the motor involved was still abnormal.

The shut down function performed by the annunciator circuit is effected by means of a set of normally-open contacts A8 associated with each of the alarm relays A, and which are connected to separate terminals, such as 47a—48a, 47b—48b, etc., the separate terminals being used to provide any selection of shutdown schemes desired. Suffice it to say at this point, as soon as one of the alarm relays A becomes energized, closure of the associated shutdown contacts A8 shut down the motor control circuits of all of the motors of the group involved. A description of the various motor control circuits and their relationship with the contacts A8 will be described hereinafter.

Refer now to FIG. 5 which illustrates the schematic diagram of the motor control circuits for a series of motors, such as 50-1, 50-2 . . . 50-5 etc. The motors 50-1 and 50-2 are related motors in a group A wherein, if any one of the motors of the group shuts down abnormally, the other motors are automatically shut down. Motor 50-5 is a motor of a second group B which is to operate and be controlled independently of the motors of group A. The motors illustrated are three phase motors energized from lines L1 and L2 and L3. The energization and control circuits of each of the motors in a particular group are substantially identical, so that a description of only one of the energization and control circuits will now be given, it being understood that the other corresponding circuits in the same group are the same. Referring to motor 50–1, line L1 is connected to one of the inputs of the motor through conventional circuit breaker contacts 51, normally-open start relay contacts M1–1 and an overload relay coil OL1. Line L2 extends to the second input of the motor through circuit breaker contacts 51', and normally-open start relay contacts M1–2. Line L3 is connected to the third input of the motor through circuit breaker contacts 51", normally-open start relay contacts M1–3 and overload relay coil OL1'. The overload relays OL1 and OL1' have normally-closed contacts OL1–1 and OL1–1' connected in series in a control circuit generally indicated by reference numeral 53–1. This circuit, as illustrated, extends between two of the input lines of the motor 50–1, such as between points on the line side of the start relay contacts M1–1 and M1–2. The control circuit 53–1 includes, in addition to the contacts OL1–1 and OL1–1', a series circuit of a start relay coil M1 which controls the various M1 contacts above mentioned, a set of normally-closed contacts AR1–1 of an aforesaid interlock relay AR1 (FIG. 6), normally-closed stop push button contacts 12a mounted on the aforesaid panel 2 (FIG. 1), a parallel circuit arrangement of normally-open start push button contacts 10a also mounted on panel 2, remote start push button contacts 10a located at the situs of the motor 50–1, normally-open contacts M1–4 constituting holding contacts of the start relay M1, and remote normally-closed stop push button contacts 12a' which are mounted adjacent the motor 50–1.

During start-up in a manner to be explained, the interlock relay AR1 is disabled (de-energized) so that its contacts AR– will be closed. Then, when either the start push botton contacts 10a or 10a' are momentarily closed, start relay M1 is energized resulting in the closing of the holding contacts M1–4 sealing in the energization of the relay M1. Energization of the relay M1 closes the aforementioned start relay contacts M1–1, M1–2 and M1–3 in the input circuits to the motor 50–1 to start the same. Motor 50–1 will become de-energized whenever the start relay M1 is de-energized, which can occur upon the energization of either of the overload relay coils OL–1 and OL1' in the input circuits to the motor, upon the momentary opening of either of the stop push button contacts 12a or 12a' or upon the opening of the interlock contacts AR1–1.

The control circuit for the motor 50–2, identified by reference numeral 53–2, has elements corresponding to those just described for control circuit 53–1 and corresponding elements have similar reference symbols except that the symbols of circuit 53–2 have a "2" where circuit 53–1 uses a "1." Control circuit 53–2, as all of the control circuits of the motors in group A, includes contacts of the same interlock relay, such as contacts AR1–2. The control circuit for the motor 50–5 in group B is identified by reference numeral 53–5 and it has similar circuit elements to that just described in connection with other control circuits, except that it has a set of interlock relay contacts AR2–1 controlled by a different interlock relay AR2 (FIG. 6).

The interlock relay circuit, including the aforesaid relays AR1 and AR2, is shown in FIG. 6. One of the terminals of relay AR1 is connected to one of the power lines L2 and the other terminal thereof is connected to the movable pole 56a of a single pole double throw switch 56 mounted on the panel 2 (FIG. 1). The switch 56 has a stationary contact 56b representing the "off" contact and a stationary contact 56c representing the "on" contact. When the pole 56a contacts the "on" contact 56c, the relay AR1 is connected to a parallel arrangement of contacts joining the other power line L1, the parallel contacts comprising the aforesaid normally-open shutdown contacts A8 of the aforesaid various annunciator units, such as shown in FIG. 5, associated with the motors of group A.

As previously indicated, there is an annunciator unit associated with each start control circuit of the motors 50–1, 50–2, etc. The start relay M1 of each control circuit has a set of normally-closed contacts M1–5 or M2–5, etc. in the alarm relay circuit of the associated annunciator unit. Thus, whenever a given motor is energized, indicating normal operation of the motor, the associated signal contacts M1–5 or M2–5 etc. are opened to de-energize the associated alarm relay A and, when the associated motor is shut down or de-energized, the latter contacts are closed to energize the associated alarm relay A which operates the shutdown contacts A8. Whenever switch 56 is closed, this will energize the associated interlock relay AR1 which, in turn, will open all of the control circuits of the motors in group A to shut down the motors involved.

Switch 56 is opened to disable the interlock relay AR1 during manually start up of the system, otherwise it would not be possible to start the motors since the shutdown system would then be operative to prevent starting of the motors involved.

The interlock relay AR2 is associated in a circuit identical to the circuit just described except that it is associated with shutdown contacts such as A8–5 of annunciator units associated with the motors in group B. Thus, a switch 56' mounted on panel 2 is provided for disabling operation of the interlock relay AR2.

Refer now to FIGS. 7 through 10 which illustrate a typical interlock and shutdown installation using the present invention as applied to an automatic feed system for the digesters of a paper mill. The mechanical elements making up the feed system are illustrated in FIG. 7. The feed system there shown has for its purpose the conveying of paper pulp from one or more of a number of pulp storage bins or silos 60–1, 60–2, 60–3, etc., to one of a number of digesters such as 62–1, 62–2, 62–3, etc. The silos have open bottoms overlying respective feed tables 64–1, 64–2, 64–3, etc. These feed tables may be conveyor belt units or the like driven respectively by electric motors 66–1, 66–2, 66–3, etc. The various silos may contain paper pulp of various grades and types. The pulp from the selected silo is fed to a conveyor belt 68–1 driven by an electric motor 70–1. The conveyor belt 68–1 discharges chips upon an inclined conveyor belt 68–2 driven by a motor 70–2. The conveyor belt 68–2 discharges its pulp on an elevated horizontal conveyor belt 68–3 driven by motor 70–3. The chips on the conveyor belt 68–3 are discharged into a suitable hopper 72 which may contain means, not shown, for directing pulp to a selected one of a number of shuttle conveyors such as 74 driven by a motor 75. This latter shuttle conveyor is carried upon a horizontally movable carriage 76. Horizontal movement may be imparted to the carriage 76 by means of a screw shaft 78 threading through the carriage 76 and a motor 80 driving the screw shaft 78. In this manner, one of the ends of the conveyor belt 74 may be brought above a selected digester 62–1, 62–2, 62–3, etc.

The position of the discharge and of the shuttle conveyor 74 may be remotely indicated through means including electric switches 80–1, 80–2, 80–3, etc. located adjacent the respective digesters and a switch actuating arm 82 carried by the frame of the shuttle conveyor 74 unit which operates the switches 80–1, 80–2, 80–3, etc. to light an indicator light to be described.

In a manner to be explained, the present invention is utilized to monitor the operation of the various aforesaid electric motors. The starter circuits of all of these motors except the screw shaft motor 80 are interlocked so that the operation of each motor depends upon the operating condition of another motor. More particularly, the operation of the starter circuits of the conveyor motors 75, 70–3, 70–2, 70–1 are interlocked in a manner so that they can begin operating only in the order named, and stoppage of any conveyor results in stoppage of at least the conveyors feeding it, and preferably of all of the conveyors.

The preferred interlock system is illustrated in FIG. 8, the various starter circuits of the motors being shown in box form. The input to the starter circuits for all of the motors includes a set of master on-off contacts 82–1 controlled by "on" and "off" pushbutton switches 82a and 82b mounted on a control panel 90 (FIG. 9), a set of start contacts 83–1 controlled by a "start" pushbutton switch 83 on the panel 90, and normally-closed shutdown contacts SD–1 which are controlled by a shutdown control relay SD (FIG. 10) in the control and annunciator circuit to be described. The master power on-off switches 82a and 82b may control a relay, not shown, which is energized and locked in to close contacts 82–1 when "on" pushbutton switch 82a is depressed and is de-energized to open contacts 82–1 when "off" pushbutton switch 82b is depressed. The latter relay may also have contacts 82–2 in the main line to the annunciator system (FIG. 10) to be described. Pushbutton start switch 83 may control another relay, not shown, which is energized and locked in when switch 83 is depressed and is de-energized when "off" pushbutton switch 82b is depressed.

Contacts 82–1 and 83–1 connect a source of power to a common power bus 85. The starter circuit for the first motor to be started, namely the carriage motor 80, includes a branch 86 which, when energized, operates the motor in one direction and a branch 87 which, when energized, operates the motor in the opposite direction. The branch 86 comprises a set of normally-closed position contacts P–1 in series with 88a–1 controlled by a three-position manual switch 88a on the panel 90 (FIG. 9), and a pair of contacts 88a–2 controlled by the manual switch 88a and which are in parallel with contacts P–1 and 88a–1. The other branch 87 includes normally-closed position contacts P–2 in series with contacts 88a–3 controlled by said manual switch 88a, and contacts 88a–4 controlled by the latter switch and shunting said contacts P–2 and 88a–3.

When the manual switch 88a is positioned in an "A" position, the carriage motor 80 is under automatic control and contacts 88a–1 and 88a–3 in series with position contacts P–1 and P–2 are closed so that the motor is under control of position contacts P–1 or P–2. Also, the contacts 88a–2 and 88a–4 are opened. When the manual switch 88a is turned to its "E" position, the contacts 88a–1, 88a–3 and 88a–4 are open, and contacts 88a–2 are closed to energize branch 86 which effects the rotation of motor 80 in one direction. When the manual switch 88a is turned to its "W" position, and said contacts 88a–1, 88a–2 and 88a–3 are open, and the contacts 88a–4 are closed to energize branch 87 which effects the rotation of motor 80 in the opposite direction. The branches 86 and 87, respectively, have relays Ma and Ma' therein which control normally-closed contacts Ma–1 and Ma'–1 connected in series in the starter circuit of the shuttle conveyor motor 75 which operates after the carriage motor 80. Thus, for automatic ("A") operation of the system, the shuttle conveyor motor 75 will not operate until the carriage motor 80 is de-energized after the initial start up of this system.

The position contacts P–1 and P–2 are controlled by a circuit (not shown) which initially closes contacts P–1 or P–2 during automatic operation depending upon the digester selected by a digester select switch 95 mounted on panel 90 (FIG. 9) which determines the direction which the carriage is to be moved to bring the end of the shuttle conveyor opposite the proper digester, and which opens the same when the shuttle conveyor is finally positioned opposite the selected digester. Since the present invention is not concerned with the details of the conveyor system, but has disclosed the same only for the purpose of illustrating an exemplary use of the invention, the details of the circuit for controlling the position contacts P–1 and P–2 has been omitted.

The starter circuit for the shuttle conveyor motor 75 includes, in addition to the contacts Ma–1 and Ma'–1 connected to the power bus 85, contacts 88b–1 controlled by a three position manual switch 88b mounted on said panel 90 (FIG. 9). When the manual switch 88b is in a position "A," the contacts 88b–1 are closed so that the starter circuit involved is under automatic control of the aforesaid contacts Ma–1 and Ma'–1. When the manual switch 88b is turned to a position "M," a pair of contacts 88b–2 connected in shunt with contacts Ma–1, Ma'–1 and 88b–1 close so that the starter circuit is under the manual control of the switch 88b. Stoppage of the motor is obtained by movement of the switch to a third "off" position in which both contacts 88b–1 and 88b–2 are open. A relay Mb is provided in the starter circuit for the shuttle conveyor motor 75 which relay has contacts Mb–1 in the starter circuit of the next conveyor motor 70–3 to be started immediately after the shuttle conveyor motor 75. Contacts Mb–1 are connected to power bus 85 and are in series with contacts 88c–1 controlled by a three-position switch 88c (FIG. 9). The latter switch also has contacts 88c–2 in shunt with the contacts Mb–1 and 88c–1. When the switch 88c is in its "A" position, contacts 88c–1 are closed and contacts 88c–1 are open. Both of the latter contacts are open when the switch is positioned in its "off" position, and switch 88c–2 is closed and switch 88c–1 is open when the switch is in its "M" position. Thus, when the switch is in the "A" position, the starter circuit involved is conditioned for automatic operation, and when in the "M" position, the starter circuit is controlled solely by the switch 88c.

The starter circuit for the conveyor motor 70–3 includes a relay Mc having contacts Mc–1 in the starter circuit of the next motor to be started, namely the conveyor motor 70–2. Contacts Mc–1 are in a circuit extending from the common bus 85 and including contacts 88d–1 controlled by a three position manual switch 88d on the panel 90 (FIG. 9). Another set of contacts 88d–2 of the latter which extend in parallel with the latter contacts Mc–1 and 88d–1. When the switch 88d is in an "A" position, it closes the contacts 88d–1 and opens the contacts 88d–2 so that the starter circuit is under control of the contacts Mc–1. When the switch 88d is in an "off" position, contacts 88d–1 and 88d–2 are open, and when the switch is in an "M" position, contacts 88d–1 are open and shunt contacts 88d–2 are closed so that the operation of the motor 70–2 is under control of the latter switch.

The starter circuit for motor 70–2 has a relay Md controlling normally-open contacts Md–1 in the starter circuit of the conveyor motor 70–1 which is to start after the starting of the conveyor motor 70–2. The contacts Md–1 are in a circuit extending from the power bus 85 and including contacts 88e–1 of a three position manual switch 88e on the panel 90 and contacts 88e–2 of the latter switch which are in shunt with the contacts Md–1 and 88e–1. When the manual switch 88e is in an "A" position, contacts 88e–1 are closed so that the starter circuit is under control of the contacts Md–1, and the contacts 88e–2 are open. When the latter switch is in an "off" position, both of the latter contacts are open, and when the switch is in an "M" position, contacts 88e–1 are open and shunt contacts 88e–2 are closed so that operation of the motor 70–1 is under control of the latter switch.

The starter circuit of motor 70–1 has a relay Me which controls normally-open contacts Me–1, Me–2 and Me–3, respectively, in the starter circuits of the silo feed table motors 66–1, 66–2 and 66–3, so that a selected one or more of the latter motors can be energized after the starting of motor 70–1. Each of the contacts Me–1, Me–2 and Me–3 is in a circuit extending from the common power bus 85 and including contacts 88f–1, 88g–1 or 88h–1, respectively, of three position silo feed table switches 88f, 88g or 88h mounted on the panel 90. The latter switches also have contacts 88f–2, 88g–2 and 88h–2, respectively, in shunt with the associated Me–1 and 88f–1, Me–2 and 88g–1, and Me–3 and 88h–1. When one of the switches 88f, 88g or 88h is placed in an "A" position, the associated contacts 88f–1, 88g–1 or 88h–1 are closed and the associated switch contacts 88f–2, 88g–2 or 88h–2 are open. Both of the associated contacts are open when the switch involved is positioned in its "off" position. When the switch involved is turned to an "M" position, the associated contacts 88f–2, 88g–2 or 88h–2 are closed and the associated contacts 88f–1, 88g–1 or 88h–1 are open so that the motor involved is controlled by the latter switch.

The relays Mb, Mc, Md and Me have contacts for controlling annunciator units in the annunciator system to be described which, in turn, control associated red and green annunciator lights, 3b—4b, 3c—4c, etc. mounted behind translucent panels 94b, 94c, etc on control panel 90. These relays also control a shutdown control relay SD (FIG. 10), so that when any of the continuously operating motors shut down by means other than the operation of a manual switch, contacts SD–1 in series with the common power bus are open to de-energize all of the starter circuits. Relay Ma of the carriage motor starter circuit has contacts which control only a green light mounted behind a translucent panel 94a on control panel 90. The starter circuits for the silo feed table motors 66–1, 66–2 and 66–3 have relays Mf, Mg and Mh which control only green lights behind translucent panels 94f, 94g and 94h. Since the carriage motor and all of the silo feed table motors are not always operating, it would be unnecessary and, in fact, impractical or inconvenient to give the associated starter circuit relays Ma, Mf, Mg and Mh any shutdown or red light-operating functions.

Reference should now be made to FIG. 9 which shows the indicator and control panel 90 for controlling and monitoring the equipment shown in FIG. 7. Panel 90 has an annunciator section 92 which includes a cabinet inserted into the panel 90 containing the various back lighted translucent panels 94a, 94b, 94c, etc. behind which are respectively mounted the differently colored lights, such as 3b—4b, 3c—4c and 3d—4d controlled by the various annunciator units of an annunciator system which may be similar to that previously described. Most of the components making up this annunciator system may be housed in the cabinet 92. Each of the back lighted panels 94 may contain imprinted directly on it or below it an identification of the electric motor with which it is associated. The positions of the various annunciator units in the cabinet 92 correspond to the order in which the various motors are started. Thus, the first panel 94a has a green running light 4a which indicates the running condition of the carriage motor 80. A red light is not used for reasons tied in with the fact that the carriage motor 80 runs only for the period required to set the carriage 76 in proper position. The shutdown of this motor during operation of the chip conveyor, therefore, would not indicate an abnormal operating condition. Failure of the green light 4a to come on when a new digester is selected would indicate failure of the motor. From left to right, the red and green lights behind the other panels monitor the abnormal shutdown and running conditions of the shuttle conveyor motor 75, the conveyor motor 70–3, 70–2 and 70–1, and the feed table motors 66–1, 66–2 and 66–3. The panel 90 further includes acknowledgement, disable and test pushbutton switches 14, 16 and 18 which operate like the similarly numbered switches previously described in connection with FIG. 1.

Panel 90 additionally includes a series of lights generally indicated by reference numeral 95 which are controlled by the aforementioned micro-switches 80–1, 80–2, 80–3, etc. in FIG. 7 indicating the position of the discharge end of the shuttle conveyor 74 at any instant.

The manner in which the control panel 90 may be used in controlling the chip conveyor system is as follows:

Initially, the "on" pushbutton switch 82a is depressed to energize the annunciator circuit (FIG. 10) and condition the starter circuit for operation upon the closing of contacts 82–1 (FIG. 8). Where automatic operation is desired, the digester selector switch 97 is then positioned to the number representing the digester desired to receive the chips, the silo feed select switch 88f, 88g or 88h associated with the desired silo is turned to "A" to select the silo from which the desired chips are to be obtained, and switches 88a, 88b, 88c, 88d and 88e are turned to "A." If the annunciator and control circuit controlling the annunciator lights 3b—4b, 3c—4c, etc., is similar to that shown in FIG. 3, the red lights 3b, 4b, etc. behind the panels 94b, 94c, etc. of one or more of the annunciator positions will be flashing and an audible alarm would sound indicating the shutdown condition of the associated motor or motors. If disable switch 18 is then depressed, the red lights would be turned off and the audible alarm silenced. However, a modified annunciator and control circuit to be described and shown in FIG. 10 is most advantageously used. This circuit has disable contacts to be described which are operated directly by the "on" pushbutton switch 82a so that the red lights and audible alarm will not be energized on start-up. Also, the disable relay SD will be prevented from operating so that the motors can be turned on. Where manual operation is desired, the one or more select switches involved are moved to their "M" position. The start switch 83 is depressed to close contacts 83–1 to start the operation of the various motors in succession automatically.

The green lights on the annunciator panels 94a, 94b, 94c, etc. will come on in the same sequence in which the motors come on. If any motor should fail to start, the associated green light will not come on and the operator will immediately know at what point in the operating chain of motors a fault is present. Assuming that all motors have turned on in the normal manner, any subsequent shutdown condition not initiated by operation of switch 82b will immediately be indicated by the flashing of the red light of the associated annunciator panel, and all motors will be automatically shut down upon the opening of contacts SD–1 (FIG. 8). All other annunciator panels will remain dark, so that the location of the fault will immediately be apparent.

When the starter circuits are de-energized by depressing the "off" pushbutton 82b, the annunciator system is disabled, that is, turned off, so no false alarms are present.

Reference should now be made to FIG. 10 which illustrates a modified annunciator circuit which has particular utility in the conveyor motor interlock and shutdown control system just described, although many aspects thereof have a broader application. As previously indicated, each of the starter circuits of conveyor motors 75, 70–3, 70–2 and 70–1 have relays Mb, Mc, Md and Me which have a set of normally-closed contacts such as contacts Mb–2 for controlling an annunciator unit like 26a previously described, and these initiate red light operating and shutdown functions. Accordingly, these contacts are connected to the signal switch connecting terminals such as 30a of an annunciator unit like 26b. However, the relays Ma, Mf, Mg and Mh of the starter circuits for the carriage motor control only green lights in the annunciator circuit and thus can operate with simplified annunciator units 26a' to be described.

The circuit of FIG. 10 is similar to the circuit of FIG. 3 in many respects. One major distinction is that contacts A8 of the individual annunciator units 26a are not used for shutdown purposes. The circuit in FIG. 3 is especially adaptable where there are different groups of motors which are to be responsive only to a shutdown in the motors of their particular groups. Since, in the embodiment of the invention now being described only one group of motors are involved, it is possible to utilize a shutdown control scheme of a somewhat different nature which has the advantage of simplicity. The circuit of FIG. 10 has provisions for disabling the shutdown portion of the system merely by depression of the acknowledgement switch 16 or the disable switch 18. Also, as previously indicated, the shutdown portion of the system is disabled automatically when the "on" pushbutton switch 82a is depressed.

The common shutdown control relay SD is connected between the line N and the horn bus R, namely in parallel with the audible alarm 6. Thus, the relay SD becomes energized during an unacknowledged, undisabled alarm condition, and this relay becomes de-energized upon depression of acknowledgement switch 16 or disable switch 18. (As previously indicated, the aforesaid contacts SD–1 are the common input to all the first motor starter circuits so that upon abnormal shutdown of any of the regularly continuously operating motors, all motors will be shut down.) "On" pushbutton switch 82a is provided with two normally-closed switches 82–3 and 82–4 in series with disable switch contacts 18a and 18b, respectively, so that on start-up both the LO and B relays will be de-energized to prevent energization of the horn bus R and the red lights through normally-open contacts B4 and LO5. The LO and B relays remain de-energized to prevent operation of the shutdown relay SD or any of the red lights until a motor resumes operation and then shuts down again. However, for the LO relay to become energized, the motor involved must be the first to be shut down in the second series of motors to shut down.

As previously indicated, the power bus N of the annunciator and control circuit has contacts 82–2 in series therewith, the contacts 82–2 being controlled through any suitable relay (not shown) which locks in and holds the contacts 82–2 upon momentary depression of the "on" pushbutton switch 82a. The holding circuit of this relay is broken upon momentary depression of the "off" pushbutton switch 82b which opens the contacts 82–2 as to de-energize the annunciator circuit and thereby preventing false alarm indications on the annunciator light panel. Also, as previously indicated, depression of the "off" pushbutton switch 82b turns off all of the motors.

Each annunciator unit 26a' associated with the non-continuously operated motors comprises an alarm relay A' connected between the power line N and a field switch connecting terminal 30' to which ground-connected, normally-open starter circuit relay contacts are connected. In the case of the starter circuit for the reversible carriage motor 80, normally-open contacts Ma–1 and Ma'–2 associated with the two branches 86 and 87 thereof are connected in parallel so that relay A' has a set of normally-open contacts A1 which close when the associated motor is operating to energize a green light 4h connected to the C bus. The upper terminal of contacts A–1 is connected to the N bus.

It should be understood that numerous modifications may be made of the various specific forms of the present invention described above without deviating from the broader aspects of the invention.

What we claim as new and desire to protect by Letters Patent of the United States is:

1. In combination, annunciator means for monitoring the operation of an apparatus, said annunciator means including visual alarm signal means providing two different indications representing the initial abnormal shutdown and acknowledged shutdown operating conditions of the apparatus, visual running signal means for providing a running indication when the apparatus is operating, audible alarm means, said annunciator means further including means for operating said visual alarm signal means to its initial abnormal shutdown indication and operating said audible alarm means when said apparatus stops operating, means for locking-in said initial abnormal shutdown indication on said visual alarm signal means, manually operable acknowledgement means for changing an initial abnormal shutdown indication on said visual alarm signal means to said acknowledged shutdown condition and for silencing said audible alarm means, automatic reset means for automatically cancelling an acknowledged shutdown indication on said visual alarm signal means when the apparatus starts operating, means for operating said visual running signal means to its running indication after acknowledgement of a shutdown condition and when the apparatus starts operating, and manually operable disable means for cancelling any abnormal shutdown indication on said visual alarm signal means independently of the actual condition of the apparatus involved until the apparatus thereafter becomes successively operating and then non-operating again.

2. In combination, an electrical annunciator circuit for monitoring the operation of an apparatus and adapted to be placed into operation independently of said apparatus, manually operable switch means for starting said apparatus, manually operable stop switch means for stopping said apparatus, said annunciator circuit including signalling means providing an indication representing the abnormal shutdown condition of the apparatus, said annunciator circuit further including means for normally operating said signalling means from its normal to its abnormal shutdown indication when said annunicator circuit is energized and said apparatus stops operating, and manually operable disable switch means for cancelling the abnormal shutdown indication of a signalling means independently of the actual condition of the apparatus involved until the apparatus thereafter becomes successively operating and then non-operating again.

3. An electrical annunciator system for monitoring the abnormal shutdown conditions of a group of apparatuses comprising: visual alarm signal means for each apparatus for providing an initial alarm indication and an acknowledged alarm indication both of which indicate that the apparatus is the first of said apparatuses to become shut down abnormally, visual running signal means for each apparatus for providing a running indication which indicates that the associated apparatus is operating, condition responsive means for each apparatus and having a normal condition when the associated apparatus is operating and an alarm condition when the associated apparatus is shut down, manually operable acknowledgement means for changing an initial alarm indication on said visual alarm signal means to said acknowledged alarm indication, lockout means for each visual alarm signal means and responsive to the operation of said condition responsive means to its alarm condition for operating the associated visual alarm signal means to its initial alarm indication and preventing similar operation of the corresponding lockout means associated with the other apparatuses for preventing operation of the associated visual alarm signal means, whereby an initial alarm indication is present only for the apparatus which was first shut down, means for locking-in said initial alarm indication on said visual alarm signal means, automatic reset means for automatically cancelling a shutdown indication on any of said visual alarm signal means after acknowledgement and the start-up of the associated apparatus, means for each apparatus for automatically operating the associated visual running signal means after acknowledgement of a shutdown condition as the apparatus begins operating again, manually operable disable means, and means for cancelling the alarm indication on any visual alarm signal means upon operation of said disable means even when the associated apparatus is still shut down until the associated apparatus resumes operation and then again shuts down.

4. An electrical annunciator system for monitoring the abnormal shutdown conditions of a group of apparatuses comprising: visual alarm means for each apparatus for providing an initial alarm indication which indicates that the apparatus is the first of said apparatuses to become shut down abnormally and an acknowledged alarm indication which indicates that said initial alarm indication has been acknowledged, visual running signal means for each apparatus for providing a running indication which indicates that the associated apparatus is operating, condition-responsive switch means for each apparatus having a first condition when the associated apparatus is shut down and a second condition when the associated apparatus is operating, lockout means for each apparatus having first and second operating conditions and operated to its first condition upon operation of said condition responsive switch means to its first shutdown indicating condition, means responsive to operation of a lockout means to its first condition for operating the associated visual alarm means to its initial alarm indication and preventing similar operation of the corresponding lockout means associated with the other apparatuses to their first condition to prevent operation of the associated visual alarm means, whereby an initial alarm indication is present only for the apparatus which first shuts down, lock-in means for each apparatus for locking the associated lockout means into said first condition, momentarily operable acknowledgement switch means for changing the indication of a visual alarm means to said acknowledged alarm indication if the condition-responsive switch means is still in its first condition and for rendering the associated lock-in means inoperative, the associated lockout means returning to its other condition when the associated condition-responsive means is in said second condition which indicates that the associated apparatus has resumed operation, means for operating each visual running signal means to its running indication when the associated lockout means is in said other condition and the associated condition-responsive means is in said second condition, momentarily operable disable switch means, and means responsive to the momentary operation of said disable switch means for operating any lockout means in said first condition to its other condition independently of the condition of the associated condition-responsive switch means, which cancels the alarm indication on the associated visual alarm means even when the associated apparatus is still shut down, until the associated apparatus resumes operation and then again shuts down.

5. An electrical annunciator system for monitoring the abnormal shutdown conditions of a group of apparatuses comprising: first visual signal means for each apparatus providing an initial alarm indication which indicates that the apparatus is the first of said apparatuses to become shut down abnormally and an acknowledged alarm indication which indicates that said initial alarm indication has been acknowledged, second visual signal means for each apparatus for providing a running indication which indicates that the associated apparatus is shut down, condition responsive means for each apparatus which has a first condition when the apparatus is shut down momentarily and a second condition when the apparatus is running, manually operable acknowledgement switch means, momentarily manually operable disable switch means, first, second and third control means associated with each apparatus and each having two operating states, means responsive to the operation of each condition responsive means to said first condition indicating the shutdown of the associated apparatus for operating said associated first control means to one of its states of operation and responsive to operation of said condition responsive means to said second condition after operation of said acknowledgement switch means for operating said first control means to its other operating state, means responsive to the concurrent operation of each first control means to said one operating state and said third control means in one of its operating states for operating said associated second control means to one of its operating states, means for holding each second control means in said one operating state independently of said associated third control means as long as said associated first control means remains in said one operating state, the return of said first control means to said other operating state resulting in the operation of said associated second control means to its other operating state, means responsive to the operation of each second control means to said one operating state for operating the associated first visual signal means to its initial alarm indication, means responsive to the simultaneous operation of each first control in its other state of operation and associated second control means in said one state of operation for operating the associated second visual signal means to said running indication, means responsive to the operation of each first control means to its other operating state for operating the associated third control means to said one operating state, means for locking each third control means in said one operating state until either said acknowledgement switch means or disable switch means is operated, whereupon said associated third control means is operated to its other operating state, means responsive to the operation of each third control means into said other operating state for changing said associated first signal means from its initial alarm indication to its acknowledged alarm indication when said associated second control means is in said one operating state thereof, and means responsive to the momentary operation of said disable switch means for returning at least momentarily each second control means to said other state of operation and each third control means to said other state of operation, momentary operation of said disable switch means cancelling any alarm indication from the associated first signal means, even if the associated apparatus is still shut down.

6. An electrical annunciator system for monitoring the abnormal shutdown conditions of a group of related apparatuses comprising: first visual signal means for each apparatus providing an initial alarm indication which indicates that the apparatus is the first of said apparatuses to become shut down abnormally and an acknowledged alarm indication which indicates that said initial alarm indication has been acknowledged, second visual signal means for each apparatus for providing a running indication which indicates that the associated apparatus is shut down, condition responsive means for each apparatus which has a first condition when the apparatus is shut down, and a second condition when the apparatus is operating, momentarily manually operable acknowledgement switch means, momentarily manually operable disable switch means, first, second and third control means associated with each apparatus and each having two operating states, means responsive to the operation of each condition responsive means to said first condition indicating the shutdown of the associated apparatus for operating said associated first control means to one of its states of operation and responsive to operation of said condition responsive means to said second condition after operation of said acknowledgement switch means for operating said first control means to its other operative state, means responsive to the concurrent operation of each first control means to said one operating state and said third control means in one of its operating states for operating said associated second control means to one of its operating states, means for holding each second control means in said one operating state independently of said associated third control means as long as said associated first control means remains in said one operating state, the return of said first control means to said other operating state resulting in the operation of said associated second control means to its other operating state, means responsive to the operation of each second control means to said one operating state for operating the associated first visual signal means to its initial alarm indication, means responsive to the simultaneous operation of each first control in its other state of operation and associated second control means in said one state of operation for operating the associated second visual signal means to said running indication, means responsive to the operation of each first control means to its other operating state for operating the associated third control means to said one operating state, means for locking each third control means in said one operating state until either said acknowledgement switch means or disable switch means is operated, whereupon said associated third control means is operated to its other operating state, means responsive to the operation of each third control means into said other operating state for changing said associated first signal means from its initial alarm indication to its acknowledged alarm indication when said associated second control means is in said one operating state thereof, means responsive to the momentary operation of said disable switch means for returning at least momentarily each second control means to said other state of operation and each third control means to said other state of operation, momentary operation of said reset switch means cancelling any alarm indication from the associated first signal means even if the associated apparatus is still shutdown, and shut down means responsive to the operation of said first control means to said one state of operation for shutting down all of said related apparatuses which have not been already shut down.

7. Control means for monitoring and controlling the operation of at least two apparatuses, said control means being adapted to be placed into operation independently of said apparatuses and comprising: respective electric controller means for each apparatus which, when energized, operates the associated apparatus and, when de-energized, stops the associated apparatus, condition-responsive means associated with each apparatus and which has a first condition when the apparatus is operating and a second condition when the apparatus is not operating, start and stop means for energizing and de-energizing said respective controller means, monitoring means controlled by said condition-responsive means and including shutdown means for de-energizing all of said controller means independently of said start and stop means when any one of said condition-responsive means is in said second condition thereof indicating that the associated apparatus is not operating, and means for disabling said shutdown means from operation by said condition-responsive means after said apparatuses have been initially shut down and until the apparatuses associated with the condition-responsive means involved has been started again.

8. Means for monitoring and controlling the operation of a given apparatus and adapted to be operated independently of said apparatus, said means comprising condition-responsive means which has a first condition when the apparatus is operating and a second condition when the apparatus is not operating, start and stop means for starting and stopping said apparatus, monitoring means controlled by said condition-responsive means and including shutdown means for automatically stopping said apparatus independently of said start and stop means when said condition-responsive means is in said second condition thereof indicating that the associated apparatus is not operating, and manually operable disable means for disabling said shut-down means from operation by said condition responsive means after said apparatus has been initially shut down and until it has been started again.

9. Means for monitoring and controlling the operation of at least two apparatuses which are to start operating in sequence, said means comprising: condition-responsive means for each apparatus and which has a first condition when the apparatus is operating and a second condition when the apparatus is not operating, manually operable start and stop means for starting and stopping said apparatuses and including means for starting said apparatuses in a given sequence, monitoring means controlled by said condition-responsive means and including shutdown means for stopping both of said apparatuses independently of said start and stop means when any one of said condition-responsive means is in said second condition thereof indicating that the associated apparatus is not operating, and manually operable means for disabling said shutdown means from operation by any of said condition-responsive means after said apparatuses have been initially shut down and until the apparatus associated with the condition-responsive means involved has been started again.

10. Means for monitoring and controlling the operation of at least two apparatuses which are to start operating in sequence, said means comprising: condition-responsive means for each apparatus and which has a first condition when the apparatus is operating and a second condition when the apparatus is not operating, manually operable start and stop means for starting and stopping said apparatuses and including means for starting said apparatuses in a given sequence, monitoring means controlled by said condition-responsive means and including shutdown means for stopping both of said apparatuses independently of said start and stop means when any one of said condition-responsive means is in said second condition thereof indicating that the associated apparatus is not operating, manually operable means for disabling said shutdown means from operation by any of said condition-responsive means after said apparatuses have been initially shutdown and until the apparatus associated with the condition-responsive means involved has been started again, and annunciator means for giving an alarm whenever said shutdown means is operated by said condition-responsive means, said annunciator means including means for indicating which apparatus first stopped operating.

11. Annunciator and control means for monitoring and controlling the operation of at least two apparatuses, said annunciator and control means being adapted to be placed into operation independently of said apparatuses and comprising: respective electric controller means for each apparatus which, when energized, operates the associated apparatus and, when de-energized, stops the associated apparatus, condition-responsive means for each apparatus and which has a first condition when the apparatus is operating and a second condition when the apparatus is not operating, start and stop means for energizing and de-energizing said respective controller means, monitoring means controlled by said condition-responsive means and including shutdown means for de-energizing all of said controller means independently of said start and stop means when any one of said condition-responsive means is in said second condition thereof indicating that the associated apparatus is not operating, and means for disabling said shutdown means from operation by said condition-responsive means after said apparatuses have been initially shutdown and until the apparatuses associated with the condition-responsive means involved has been started again, and annunciator means for giving an alarm whenever said shutdown means is operated by said condition-responsive means, said annunciator means including means for indicating which apparatus first stopped operating.

12. In combination, an electrical annunciator circuit for monitoring the operation of an apparatus and adapted to be placed into operation independently of said apparatus, manually operable switch means for starting said apparatus, manually operable stop switch means for stopping said apparatus, said annunciator circuit including signalling means providing at least two different indications representing the abnormal shut down and running operating conditions of the apparatus, said annunciator circuit further including control means for normally operating said signalling means to its initial abnormal shutdown indication and locking-in the latter indication when said annunciator circuit is energized and said apparatus stop operating and preventing operation of said signalling means to said running indication as long as said shutdown indication persists, and manually operable switch means for preventing operation of the abnormal shutdown indication on said signalling means even though the apparatus has not started yet to enable said signalling means to provide said running indication when said apparatus starts operating again.

13. In combination, an electrical annunciator circuit for monitoring the operation of an apparatus and adapted to be placed into operation independently of said apparatus, first manually operable switch means for energizing the annunciator circuit, manually operable switch means for starting said apparatus, manually operable stop switch means for stopping said apparatus, said annunciator circuit including signalling means providing at least two different indications representing the initial abnormal shut down and normal operating conditions of the apparatus, said annunciator circuit further including means for normally operating said signalling means from its normal to its initial abnormal shutdown indication when said annunciator circuit is energized and said apparatus stops operating, means responsive to operation of said first manually operable switch means for preventing operation of the abnormal shutdown indication on said signalling means even though the apparatus has not started yet until the apparatus has started and then stopped independently of said stop switch means, and means responsive to operation of said stop switch means for disabling operation of said signalling means.

14. Annunciator and control means for monitoring and controlling the operation of at least two apparatuses, said annunciator and control means being adapted to be placed into operation independently of said apparatuses and comprising: respective electric controller means for each apparatus which, when energized, operates the associated apparatus and, when de-energized, stops the associated apparatus, condition-responsive means for each apparatus and which has a first condition when the apparatus is operating and a second condition when the apparatus is not operating, start and stop means for energizing and de-energizing said respective controller means, monitoring means controlled by said condition-responsive means and including shutdown means for de-energizing all of said controller means independently of said start and stop means when any one of said condition-responsive means is in said second condition thereof indicating that the associated apparatus is not operating, and means for disabling said shutdown means from operation by said condition-responsive means after said apparatuses have been initially shut down and until the apparatuses associated with the condition-responsive means involved has been started again, annunciator means for giving an alarm whenever said shutdown means is operated by said condition-responsive means, said annunciator means including means for indicating which apparatus first stopped operating, and means responsive to operation of said stop means for preventing an alarm by said annunciator means.

References Cited in the file of this patent

UNITED STATES PATENTS

| | | |
|---|---|---|
| 2,701,872 | Marmorstone | Feb. 8, 1955 |
| 2,719,966 | Schurr | Oct. 4, 1955 |
| 2,730,702 | Marmorstone | Jan. 10, 1956 |
| 2,752,588 | Marmorstone | June 26, 1956 |
| 2,820,217 | Sperry | Jan. 14, 1958 |
| 2,917,731 | Rodgers | Dec. 15, 1959 |